(No Model.)

W. WHITLOCK.
DRILL CHUCK.

No. 506,024. Patented Oct. 3, 1893.

WITNESSES:
Frank S. Ober
H. A. Offerman

INVENTOR
William Whitlock
BY
M. A. Rosenbaum
ATTORNEY

UNITED STATES PATENT OFFICE.

WILLIAM WHITLOCK, OF NEW YORK, N. Y.

DRILL-CHUCK.

SPECIFICATION forming part of Letters Patent No. 506,024, dated October 3, 1893.

Application filed May 29, 1893. Serial No. 475,842. (No model.)

*To all whom it may concern:*

Be it known that I, WILLIAM WHITLOCK, a citizen of the United States, residing at New York, in the county of New York and State of New York, have invented certain new and useful Improvements in Drill-Chucks, of which the following is a full, clear, and exact description.

My invention relates to drill chucks of that type in which a conical screw-threaded sleeve bears against the back of a plurality of jaws to force them against the tool, and in which the jaws are mounted on springs so that they will expand or retract when the pressure on the conical sleeve is removed to release the tool.

The object of the invention is to cheapen the cost of manufacturing this type of chuck and at the same time produce a serviceable and efficient device.

The invention consists of the details of construction hereinafter described and pointed out in the claims.

Figure 1:
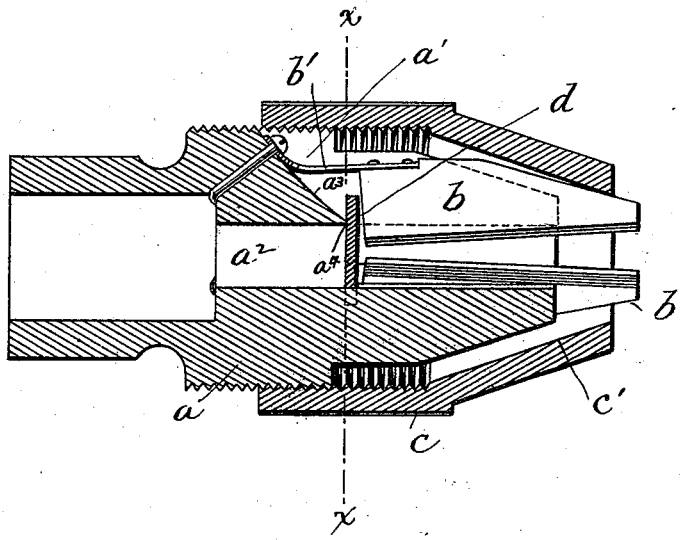
Figure 2:
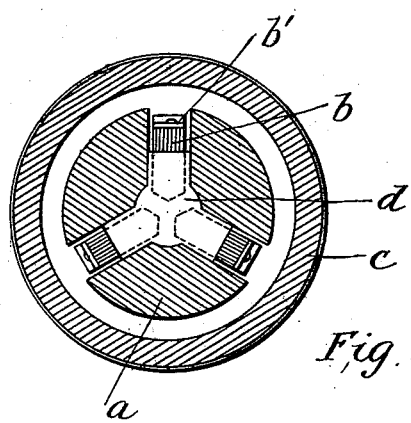
Figure 3:

In the accompanying drawings, Figure 1 is a longitudinal central section of a tool chuck constructed in accordance with my invention. Fig. 2 is a transverse section of the same taken on line $x\ x$ of Fig. 1; and Fig. 3 is a detail.

Referring to the drawings by letter, $a$ represents the chuck head; it is provided with the three ordinary radial grooves or slots $a'$ in which the clamping jaws are located. This head is ordinarily made with two axial cavities or chambers entering at opposite ends, the solid material being left between them to furnish an abutment for the end of the tool. It is difficult to form the head accurately in this way because the two cavities have to be formed from different centers and the parts are not always true. In order to be able to manufacture these devices with greater accuracy, I propose to bore a single axial passage all the way through and the entire head may then be constructed from the one center. But in doing this the abutment for the end of the tool is removed and it becomes necessary to provide another. Again, when the solid abutment is left in place under the old process the radial kerfs or slots $a'$ have to be formed partially by hand. The forward portion of the slots is cut out by means of a milling wheel very easily, but the rear part which is formed adjacent to the solid abutment must be chipped out with a cold chisel because the milling wheel in running backward will necessarily cut into and destroy the abutment. In the construction which I have provided herein the solid abutment is entirely removed by boring the continuous passage; the milling wheel may run directly back as far as necessary and the entire slot or kerf formed without using the cold chisel. I also provide an abutment which will be hereinafter referred to.

The continuous axial passage is represented by $a^2$. One of the slots or kerfs $a'$ is shown complete and it will be seen that its rear end is bounded by a curved surface $a^3$ which is formed by the milling wheel; this leaves a thin point of metal $a^4$ at the base of the slot. An abutment is provided in the shape of a flat piece of metal $d$ having the form of a three pointed star with a circular center. This is driven into the axial passage from the forward end until it strikes the three points $a^4$. The circular portion of the abutment closes the passage and the three arms pass respectively into the three kerfs or slots in which the jaws move. This abutment is driven in friction tight, and it will be seen furnishes a sufficient support for the tool. In each slot a jaw $b$ is placed and as usual these jaws are supported upon springs $b'$ which tend to retract them when the inward pressure is removed. The rear ends of the jaws are at right angles to their gripping edges and stand immediately in front of the abutment $d$. When the jaws are thrown inward, the end thrust which may be imparted to them is received by the abutment and the springs are thus protected. The jaws are provided with the usual inclined backs which are engaged by the conical sleeve $c'$ to throw them in when the tool is inserted.

It will be observed that a chamber is necessary back of the jaws to receive the springs $b'$, and under the old method of construction this chamber added considerably to the necessary amount of hand work, whereas it will be seen that the milling wheel will readily perform it under the construction herein proposed. By my invention a much more accurate and cheap chuck may be fabricated.

Having thus described my invention, I claim—

1. The combination of the chuck-head provided with an axial passage and with radial kerfs, clamping jaws moving radially in said kerfs, and a star shaped piece of flat metal standing across the axial passage with its arms entering the kerfs and located immediately back of the clamping jaws, substantially as and for the purpose set forth.

2. The combination of the chuck head provided with an axial passage and the radial kerfs, spring mounted jaws located in said kerfs, means for forcing the jaws inward, and a star shaped piece of flat metal located across the axial passage immediately back of and forming an abutment for the clamping jaws, substantially as described.

In testimony whereof I subscribe my signature in presence of two witnesses.

WILLIAM WHITLOCK.

Witnesses:
FRANK S. OBER,
W. A. OPPERMAN.